United States Patent
Suzuki et al.

(10) Patent No.: US 6,950,254 B2
(45) Date of Patent: Sep. 27, 2005

(54) MAGNETIC TRANSFER APPARATUS FOR ESTABLISHING MAGNETIC PATTERN ON MAGNETIC DISK

(75) Inventors: Hiroyuki Suzuki, Kawasaki (JP); Hitoshi Komoriya, Kawasaki (JP); Yutaka Nakamura, Kawasaki (JP); Takao Hirahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 68 days.

(21) Appl. No.: 10/633,758

(22) Filed: Aug. 4, 2003

(65) Prior Publication Data

US 2004/0027708 A1 Feb. 12, 2004

(30) Foreign Application Priority Data

Aug. 2, 2002 (JP) ........................................ 2002-225661

(51) Int. Cl.[7] ................................................. G11B 5/86
(52) U.S. Cl. ............................. 360/17; 360/15; 360/16
(58) Field of Search ..................................... 360/15–17

(56) References Cited

U.S. PATENT DOCUMENTS

| | | | | |
|---|---|---|---|---|
| 5,022,017 A | * | 6/1991 | Jansen et al. ............ 369/13.14 |
| 5,991,104 A | * | 11/1999 | Bonyhard ..................... 360/15 |
| 6,643,079 B1 | * | 11/2003 | Komatsu et al. .............. 360/17 |
| 6,813,105 B2 | * | 11/2004 | Takano ........................ 360/17 |
| 6,813,106 B1 | * | 11/2004 | Mallary ....................... 360/17 |
| 2001/0048568 A1 | * | 12/2001 | Ikeda et al. .................. 360/59 |
| 2002/0075582 A1 | * | 6/2002 | Takano ........................ 360/17 |
| 2003/0043486 A1 | * | 3/2003 | Nakamura et al. ............ 360/17 |

* cited by examiner

Primary Examiner—David Hudspeth
Assistant Examiner—Dismery Mercedes
(74) Attorney, Agent, or Firm—Greer, Burns & Crain, Ltd.

(57) ABSTRACT

A magnetic transfer apparatus is utilized to establish magnetization on the surface of a magnetic disk. A support mechanism supports the magnetic disk in the magnetic transfer apparatus. A magnetizing mechanism is designed to get opposed to the magnetic disk held by the support mechanism. The magnetizing mechanism applies a magnetic field of variable intensity in response to a change of position in the radial direction of the magnetic disk. The magnetic transfer apparatus enables establishment of a magnetic field of an appropriate intensity at any positions in the radial direction of the magnetic disk. Magnetization of a constant intensity can be established over the surface of the magnetic disk irrespective of a position in the radial direction of the magnetic disk. The magnetic transfer apparatus alone serves to establish a servo pattern of a clear magnetization on the magnetic disk.

23 Claims, 9 Drawing Sheets

MAGNETIC TRANSFER APPARATUS FOR ESTABLISHING MAGNETIC PATTERN ON MAGNETIC DISK

BACKGROUND OF THE INVENTION

1. Field of the Invention

The present invention relates to a magnetic transfer apparatus designed to write a servo pattern on a magnetic disk. The magnetic disk is often incorporated within a magnetic storage device such as a hard disk drive (HDD).

2. Description of the Prior Art

A magnetic transfer apparatus is well known in the art of a magnetic recording disk drive such as a hard disk drive (HDD). The magnetic transfer apparatus is utilized to establish a rough copy of a servo pattern over a magnetic disk. The magnetic disk is thereafter assembled into the HDD. A magnetic head is utilized to establish a final magnetization over the magnetic disk along the servo pattern within the HDD. The magnetic head is appropriately positioned in accordance with the rough copy of the servo pattern in the HDD. A clear servo pattern is in this manner established on the magnetic disk.

A rough copy should be established on the magnetic disk prior to assembling of the magnetic disk into the enclosure of the HDD in the above-described method of writing a servo pattern. A magnetic head of the HDD cannot appropriately be positioned in the HDD without the rough copy of the servo pattern. However, the writing operation should be duplicated to establish the clear servo pattern in this method. The operation gets troublesome. The working time gets elongated. It is preferable to establish a clear servo pattern on a magnetic disk solely with a magnetic transfer apparatus.

SUMMARY OF THE INVENTION

It is accordingly an object of the present invention to provide a magnetic transfer apparatus capable of establishing a clear servo pattern by itself on a magnetic disk.

According to the present invention, there is provided a magnetic transfer apparatus comprising: a support mechanism designed to support a magnetic disk; and a magnetizing mechanism designed to get opposed to the magnetic disk held by the support mechanism, said magnetizing mechanism applying a magnetic field of variable intensity in response to a change of position in the radial direction of the magnetic disk.

The magnetic transfer apparatus enables establishment of a magnetic field of an appropriate intensity at any positions in the radial direction of the magnetic disk. Magnetization of a constant intensity can be established over the surface of the magnetic disk irrespective of a position in the radial direction of the magnetic disk. The magnetic transfer apparatus alone serves to establish a servo pattern of a clear magnetization on the magnetic disk. Magnetization need not be overwritten on the magnetic disk with a read/write electromagnetic transducer incorporated within a resulting magnetic storage device. Establishment of the servo pattern can be facilitated and realized in a shorter period.

The magnetizing mechanism may comprise: a master magnetic body contacting against the magnetic disk a contact surface bordered along the contour of a servo pattern, said master magnetic body defining in the contact surface a depression corresponding to the shape of the servo pattern, the circumferential extent of the depression being set larger at an outer position of the magnetic disk than an inner position of the magnetic disk; a magnet designed to face the master magnetic body, said magnet applying a magnetic field to the master magnetic body so as to form a magnetic field for writing within the depression; and a position sensor related to the magnet so as to detect the position of the magnet in the radial direction of the magnetic disk.

The magnet is allowed to move in the radial direction of the magnetic disk. The position sensor detects the position of the magnet in the radial direction of the magnetic disk. The output of the position sensor can be utilized to adjust the intensity of the magnetic field acting on the master magnetic body from the magnet. In the case where an electromagnet is employed, as the magnet, to exhibit the magnetic field in response to supply of electric current, the magnitude of the electric current may be control to adjust the intensity of the generated magnetic field. Alternatively, in the case where a permanent magnet is employed, as the magnet, to exhibit the magnetic field based on the inherent magnetic property, the distance may be varied between the permanent magnet and the master magnetic body to adjust the intensity of the generated magnetic field.

The depression is usually defined to have a larger width in the circumferential direction at a position closer to the outer periphery of the magnetic disk. The increase in the width leads to an increased space between the opposed surfaces within the depression. Specifically, a write gap defined in the master magnetic body is increased at a position closer to the outer periphery of the magnetic disk. The simple increase in the write gap induces a decrease in the intensity of the generated magnetic field. If the intensity of the magnetic field acting from the magnet is increased in response to the increase in the write gap, the intensity of the magnetic field can be maintained constant within the depression at any radial position of the magnetic disk. The magnetization of the constant intensity can thus be established all over the surface of the magnetic disk. The servo pattern of a clear magnetization can reliably be established on the magnetic disk.

The magnetic transfer apparatus of the type may further include a magnetic intensity adjusting mechanism related to the magnet, said magnetic intensity adjusting mechanism designed to drive the magnet for rotation around the rotation axis intersecting the surface of the magnetic disk in accordance with the position of the magnet.

For example, the master magnetic body is usually designed to increase the inclination angle, defined between the depression and the radius of the magnetic disk, at a location closer to the outer periphery of the magnetic disk. The magnetic intensity adjusting mechanism serves to change the attitude of the magnet around the rotation axis in response to a variation in the inclination angle. If the attitude of the magnet follows the variation of the inclination angle, the magnetic flux leaked from the magnet is allowed to cross the depression by the minimum length. The magnetic field of the maximum intensity is thus reliably formed within the depression. This adjustment contributes to a fine adjustment of the intensity of the magnetic field within the depression.

The support mechanism may comprise: a driving shaft receiving the magnetic disk; and a controlling mechanism related to the driving shaft, said controlling mechanism designed to change the rotation speed of the driving shaft in accordance with the position of the magnet.

In general, if the magnetic disk rotates at a constant rotational speed, the relative speed increases between the magnet and the magnetic disk at a position closer to the outer periphery of the magnetic disk. The relative speed inevitably induces the deviation of the magnetic intensity, namely the offset of the magnetic field acting on the master magnetic body from the magnet. The magnetic transfer apparatus of the type enables establishment of a constant relative speed between the magnetic disk and the magnet based on the action of the controlling mechanism. If the relative speed is maintained constant between the electromagnet and the magnetic disk all over the radial positions of the magnetic disk, the magnetic disk is allowed to receive the magnetic flux of the magnet with a constant offset of the magnetic field irrespective of the position of the magnet in the radial direction of the magnetic disk. The magnetization is thus uniformly established all over the surface of the magnetic disk. If the relative speed varies between the magnet and the magnetic disk, the offset of the magnetic field is expected to establish the magnetization of different intensities over the surface of the magnetic disk.

The magnetizing mechanism may comprise: the aforementioned master magnetic body; an electromagnet designed to face the master magnetic body, said electromagnet generating a magnetic field in response to supply of electric power so as to form a magnetic field within the depression; and a magnetic intensity adjusting mechanism related to the electromagnet, said magnetic intensity adjusting mechanism designed to change the magnitude of the electric power in accordance with the displacement of the electromagnet in the radial direction of the magnetic disk.

The magnetic transfer apparatus of the type allows the intensity of the electromagnet to get increased at a position closer to the outer periphery of the magnetic disk. Even when the depression is designed to have a larger width in the circumferential direction at a position closer to the outer periphery of the magnetic disk, the intensity of the magnetic field acting from the electromagnet can be controlled to increase in response to the increase in the width. The intensity of the magnetic field can thus be maintained constant within the depression at any radial position of the magnetic disk. The magnetic transfer apparatus of the type may allow the magnetic intensity adjusting mechanism to induce the rotation of the electromagnet around the rotational axis perpendicular to the surface of the magnetic disk in response to the displacement of the electromagnet in the radial direction of the magnetic disk in the aforementioned manner. Moreover, the support mechanism may comprise: a driving shaft receiving the magnetic disk; and a controlling mechanism related to the driving shaft, said controlling mechanism designed to change the rotation speed of the driving shaft in accordance with the position of the electromagnet.

Furthermore, the magnetizing mechanism may comprise: the aforementioned master magnetic body; a magnet designed to face the master magnetic body, said magnet applying a magnetic field to the master magnetic body so as to form a magnetic field for writing within the depression; and a magnetic intensity adjusting mechanism related to the magnet, said magnetic intensity adjusting mechanism designed to generate the displacement of the magnet in the vertical direction perpendicular to the surface of the magnetic disk in response to the displacement of the magnet in the radial direction of the magnetic disk.

The magnetic transfer apparatus of the type enables adjustment of the distance between the magnet and the master magnetic body in accordance with the displacement of the magnet. The adjustment of the distance serves to increase the intensity of the magnetic field at a position closer to the outer periphery of the magnetic disk. Even when the depression is designed to have a larger width in the circumferential direction at a position closer to the outer periphery of the magnetic disk, the intensity of the magnetic field acting from the magnet can be adjusted to increase in response to the increase in the width. The intensity of the magnetic field can thus be maintained constant within the depression at any radial position of the magnetic disk. The magnetic transfer apparatus of the type may allow the magnetic intensity adjusting mechanism to induce the rotation of the magnet around the rotational axis perpendicular to the surface of the magnetic disk in response to the displacement of the magnet in the radial direction of the magnetic disk in the aforementioned manner. Moreover, the support mechanism may comprise: a driving shaft receiving the magnetic disk; and a controlling mechanism related to the driving shaft, said controlling mechanism designed to change the rotation speed of the driving shaft in accordance with the position of the magnet. In this case, an electromagnet may be employed, as the magnet, to exhibit the magnetic field in response to supply of electric current. Alternatively, a permanent magnet may be employed, as the magnet, to exhibit the magnetic field based on the inherent magnetic property.

Furthermore, the magnetizing mechanism may comprise: the aforementioned master magnetic body; a magnet designed to face the master magnetic body, said magnet applying a magnetic field to the master magnetic body so as to form a magnetic field for writing within the depression; and a magnetic intensity adjusting mechanism related to the magnet, said magnetic intensity adjusting mechanism designed to drive the magnet for rotation around the rotation axis intersecting the surface of the magnetic disk in accordance with the displacement of the magnet in the radial direction.

For example, the master magnetic body is usually designed to increase the inclination angle, defined between the depression and the radius of the magnetic disk, at a location closer to the outer periphery of the magnetic disk. The magnetic intensity adjusting mechanism serves to change the attitude of the magnet around the rotation axis in response to a variation in the inclination angle. If the attitude of the magnet follows the variation of the inclination angle, the magnetic flux leaked from the magnet is allowed to cross the depression by the minimum length. The magnetic field of the maximum intensity is thus reliably formed within the depression. This adjustment contributes to a fine adjustment of the intensity of the magnetic field within the depression. Here, an electromagnet may be employed, as the magnet, to exhibit the magnetic field in response to supply of electric current. Alternatively, a permanent magnet may be employed, as the magnet, to exhibit the magnetic field based on the inherent magnetic property. The support mechanism may comprise: a driving shaft receiving the magnetic disk; and a controlling mechanism related to the driving shaft, said controlling mechanism designed to change the rotation speed of the driving shaft in accordance with the position of the magnet.

Furthermore, the magnetizing mechanism may comprise: a master magnetic body contacting against the magnetic disk a contact surface bordered along the contour of a servo pattern, said master magnetic body defining in the contact surface a depression corresponding to the shape of the servo pattern, the circumferential extent of the depression being set larger at an outer position of the magnetic disk than an inner position of the magnetic disk; and a pair of magnetic poles spaced from the master magnetic body at variable distances in accordance with positions in the radial direction of the magnetic disk.

The magnetic transfer apparatus of the type allows the intensity of the magnetic field to get increased at a position closer to the outer periphery of the magnetic disk based on the distance between the magnetic poles and the master magnetic body. Even when the depression is designed to have a larger width in the circumferential direction at a position closer to the outer periphery of the magnetic disk, the intensity of the magnetic field acting from the magnetic poles can be adjusted to increase in response to the increase in the width. The intensity of the magnetic field can thus be maintained constant within the depression at any radial position of the magnetic disk. The magnetic transfer apparatus of the type may further comprise a magnetic intensity adjusting mechanism designed to drive the magnetic poles for rotation around the rotation axis intersecting the surface of the magnetic disk. Moreover, the support mechanism may comprise: a driving shaft receiving the magnetic disk; and a controlling mechanism related to the driving shaft, said controlling mechanism designed to change the rotation speed of the driving shaft in accordance with the position of the magnetic poles. The magnetic poles may be formed based on an electromagnet exhibiting the magnetic field in response to supply of electric current. Alternatively, the magnetic poles may be formed based on a permanent magnet exhibiting the magnetic field based on the inherent magnetic property.

Furthermore, the magnetizing mechanism may comprise: the aforementioned master magnetic body; and a pair of magnetic poles designed to face the master magnetic body, said magnetic poles being spaced from each other at variable distances in accordance with positions in the radial direction of the magnetic disk.

The magnetic transfer apparatus of the type allows the intensity of the magnetic field to get increased at a position closer to the outer periphery of the magnetic disk based on the distance between the magnetic poles. Even when the depression is designed to have a larger width in the circumferential direction at a position closer to the outer periphery of the magnetic disk, the intensity of the magnetic field acting from the magnetic poles can be adjusted to increase in response to the increase in the width. The intensity of the magnetic field can thus be maintained constant within the depression at any radial position of the magnetic disk. The magnetic transfer apparatus of the type may further comprise a magnetic intensity adjusting mechanism designed to drive the magnetic poles for rotation around the rotation axis intersecting the surface of the magnetic disk. Moreover, the support mechanism may comprise: a driving shaft receiving the magnetic disk; and a controlling mechanism related to the driving shaft, said controlling mechanism designed to change the rotation speed of the driving shaft in accordance with the position of the magnetic poles. The magnetic poles may be formed based on an electromagnet exhibiting the magnetic field in response to supply of electric current. Alternatively, the magnetic poles maybe formed based on a permanent magnet exhibiting the magnetic field based on the inherent magnetic property.

Furthermore, the magnetizing mechanism may comprise: the aforementioned master magnetic body; and a pair of magnetic poles designed to face the master magnetic body, said magnetic poles generating the flow of magnetic flux in at least first and second directions within a plane including the surface of the magnetic disk.

For example, the master magnetic body is usually designed to change the inclination angle, defined between the depression and the radius of the magnetic disk, at locations in the radial direction of the magnetic disk. The direction of the magnetic flux can be set between the magnetic poles depending on the inclination angle. Even if the inclination angle varies between the depression and the radius of the magnetic disk, the magnetic flux is always allowed to cross the depression by the minimum length without any change in the attitude of the magnetic poles. The magnetic field of the maximum intensity can always reliably be established within the depression.

A curved surface may be defined on at least one of the magnetic poles. The curved surface is opposed to the other of the magnetic poles. The curved surface may be utilized to form the magnetic flux. In this case, the direction of the magnetic flux can continuously be changed at least between the first and second directions.

The support mechanism in the magnetic transfer apparatus of the type may comprise: a driving shaft receiving the magnetic disk; and a controlling mechanism related to the driving shaft, said controlling mechanism designed to change a rotation speed of the driving shaft in accordance with a displacement of the magnetic poles in the radial direction of the magnetic disk. The magnetic poles may be formed based on an electromagnet exhibiting the magnetic field in response to supply of electric current. Alternatively, the magnetic poles may be formed based on a permanent magnet exhibiting the magnetic field based on the inherent magnetic property.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
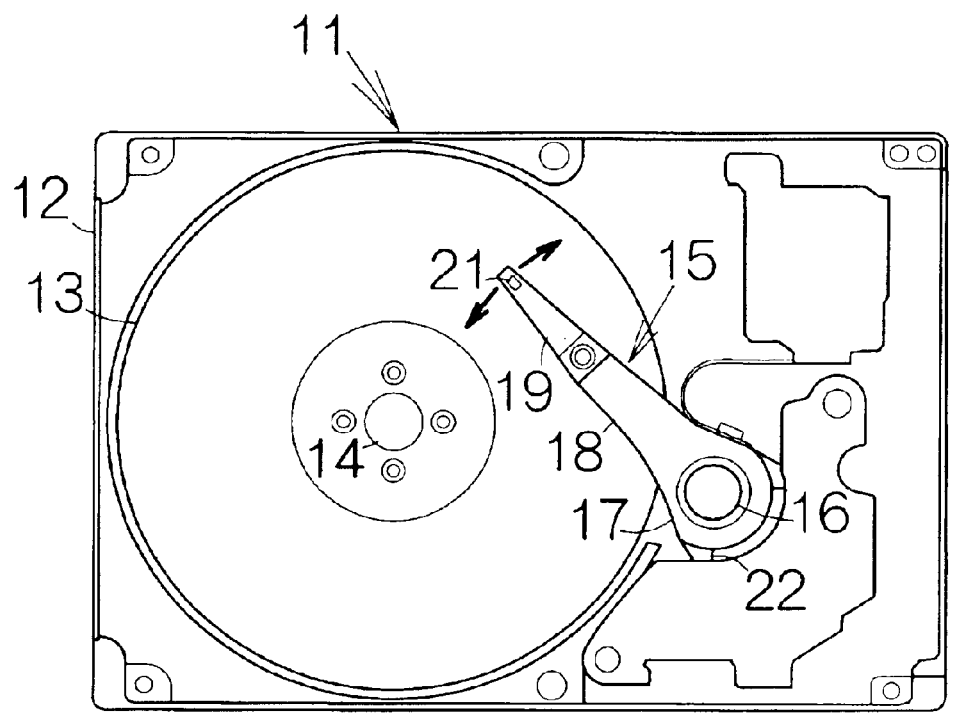
FIG. 1 is a plan view schematically illustrating the structure of a hard disk drive (HDD) as an example of a magnetic recording medium drive.

FIG. 1 schematically illustrates the inner structure of a hard disk drive (HDD) 11 as an example of a magnetic recording device or storage system. The HDD 11 includes a box-shaped main enclosure 12 defining an inner space of a flat parallelepiped, for example. At least one magnetic recording disk 13 is incorporated in the inner space within the main enclosure 12. The magnetic recording disk 13 is mounted on the driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the main enclosure 12 so as to define the closed inner space between the main enclosure 12 and itself.

A head actuator 15 is also incorporated within the inner space of the main enclosure 12. The head actuator 15 includes an actuator block 17 supported on a vertical support shaft 16 for rotation. Rigid actuator arms 18 are defined in the actuator block 17. The actuator arms 18 are designed to extend in a horizontal direction from the vertical support shaft 16. The actuator arms 18 are associated with the front and back surfaces of the magnetic recording disk or disks 13, respectively. The actuator block 17 may be made of aluminum. Molding process may be employed to form the actuator block 17.

Elastic head suspensions 19 are fixed to the tip ends of the actuator arms 18. The individual head suspension 19 is designed to extend forward from the corresponding tip end of the actuator arm 18. As conventionally known, a flying head slider 21 is supported on the front end of the individual head suspension 19. The flying head slider 21 is associated with the actuator block 17 in this manner. The flying head sliders 21 are opposed to the surfaces of the magnetic recording disk or disks 13.

A magnetic head or read/write electromagnetic transducer, not shown, is mounted on the flying head slider 21. The read/write electromagnetic transducer includes, for example, a read element and a write element. The read element is represented by a giant magnetoresistive (GMR) element or a tunnel-junction magnetoresistive (TMR) element designed to utilize variation in the electric resistance of a spin valve film or tunnel-junction film so as to discriminate magnetic bit data on the magnetic recording disk 13. The write element is represented by a thin film magnetic head designed to utilize a magnetic field, generated at a thin film coil pattern, so as to record magnetic bit data into the magnetic recording disk 13.

The head suspension 19 serves to urge the flying head slider 21 toward the surface of the magnetic recording disk 13. When the magnetic recording disk 13 rotates, the flying head slider 21 is allowed to receive airflow generated along the rotating magnetic recording disk 13. The airflow serves to generate a lift on the flying head slider 21. The flying head slider 21 is thus allowed to keep flying above the surface of the magnetic recording disk 13 during the rotation of the magnetic recording disk 13 at a higher stability established by the balance between the lift and the urging force of the head suspension 19.

A power source 22 such as a voice coil motor (VCM) is connected to the tail of the actuator block 17. The power source 22 drives the actuator block 17 for rotation around the support shaft 16. The rotation of the actuator block 17 induces the swinging movement of the actuator arms 18 and the head suspensions 19. When the actuator arm 18 is driven to swing about the support shaft 16 during the flight of the flying head slider 21, the flying head slider 21 is allowed to cross the recording tracks defined on the magnetic recording disk 13 in the radial direction of the magnetic recording disk 13. This radial movement serves to position the flying head slider 21 right above a target recording track on the magnetic recording disk 13. As conventionally known, in the case where two or more magnetic recording disks 13 are incorporated within the inner space of the main enclosure 12, a pair of the elastic head suspensions 19 and the actuator arms 18 are disposed between the adjacent magnetic recording disks 13.

Figure 2:
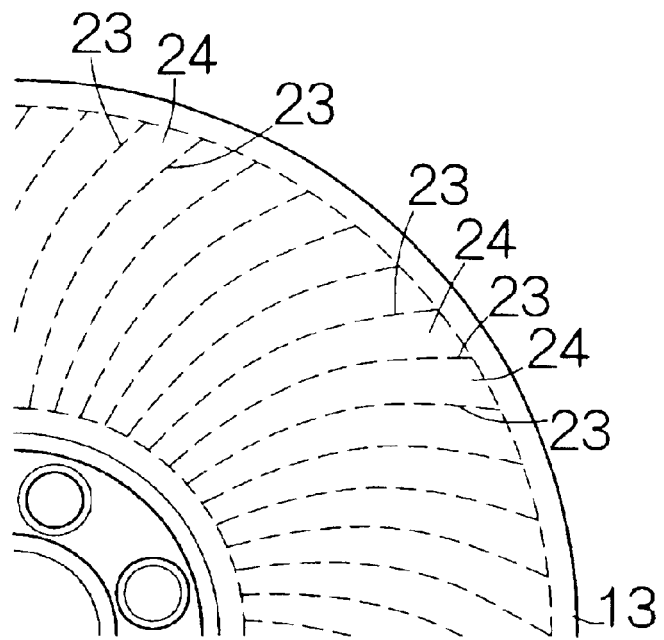
FIG. 2 is an enlarged partial plan view schematically illustrating the structure of a magnetic recording medium or magnetic recording disk.

As shown in FIG. 2, stripes of bent servo sector regions 23, for example, sixty of those, are defined on the front and back surfaces of the magnetic recording disk 13, respectively. The individual servo sector regions 23 are designed to extend in the radial direction of the magnetic recording disk 13. Predetermined servo patterns are established in the servo sector regions 23. The read/write electromagnetic transducer on the flying head slider 21 is allowed to extract a magnetic information out of the servo patterns. The extracted magnetic information is utilized to position the flying head slider 21 in the radial direction of the magnetic recording disk 13. The servo patterns will be described later in detail. The curvature of the servo sector region 23 is determined based on the path of movement of the read/write electromagnetic transducer.

Data storage regions 24 are established between the adjacent servo sector regions 23 for holding the magnetic information or binary data. When the flying head slider 21 is positioned in the radial direction of the rotating magnetic recording disk 13, the read/write electromagnetic transducer on the flying head slider 21 is allowed to keep tracing a target recording track. The write element of the read/write electromagnetic transducer operates to establish a magnetic bit data on the data storage region 24 along the recording track. Likewise, the read element of the read/write electromagnetic transducer operates to read a string of bit data out of the data storage region 24 along the recording track.

Figure 3:
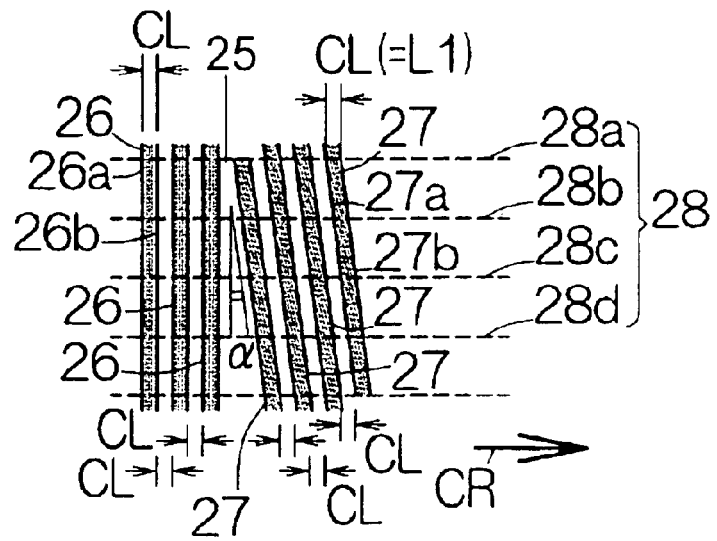
FIG. 3 is a schematic view illustrating a servo track established on the magnetic recording disk at an inner radial position.

As shown in FIG. 3, a predetermined servo pattern 25 is formed in the individual servo sector region 23, for example. The servo pattern 25 includes reference magnetized stripes 26 and phase magnetized stripes 27. The reference magnetized stripes 26 are designed to extend on a radius of the magnetic recording disk 13. The phase magnetized stripes 27 are designed to extend on an inclined line intersecting the radius by a predetermined inclination angle $\alpha$. Magnetization is established in the reference magnetized stripes 26 and the phase magnetized stripes 27 in a predetermined direction along the circumferential direction CR of the magnetic recording disk 13. Magnetization is established at the periphery of the reference magnetized stripes 26 and the phase magnetized stripes 27 in the direction opposite to the aforementioned predetermined direction. Here, the magnetizations are headed to each other at upstream contours 26a, 27a of the magnetized stripes 26, 27, for example, while the magnetizations are headed in the opposite directions from the downstream contours 26b, 27b of the magnetized stripes 26, 27. The terms such as "upstream" and "downstream" are designed to specify the direction in accordance with the movement of the flying head slider 21 relative to the rotating magnetic recording disk 13.

Constant spaces CL are set between the upstream contour 26a and the downstream contour 26b in the circumferential direction of the magnetic recording disk 13 within the individual reference magnetized stripe 26. In addition, the constant spaces CL are likewise set between the adjacent reference magnetized stripes 26 in the circumferential direction of the magnetic recording disk 13. When the read element of the read/write electromagnetic transducer passes above the reference magnetized stripes 26 along the circumferential direction CR, the maximum and minimum peaks alternately appear at equal intervals in a signal reproduced at the read element. A pulse signal is in this manner generated. The peaks are synchronized for a plurality of recording tracks 28a–28d in a recording track set 28, for example. In this case, four of the recording tracks 28a–28d are contained within the individual recording track set 28.

Likewise, constant spaces CL are set between the upstream contour 27a and the downstream contour 27b in the circumferential direction of the magnetic recording disk 13 within the individual phase magnetized stripe 27. In addition, the constant spaces CL are likewise set between the adjacent phase magnetized stripes 27 in the circumferential direction of the magnetic recording disk 13. When the read element of the read/write electromagnetic transducer passes above the phase magnetized stripes 27 along the circumferential direction CR, the maximum and minimum peaks alternately appear at equal intervals in a signal reproduced at the read element. A pulse signal is thus generated. The peaks corresponding to the phase magnetized stripes 27 appear at different phases for the recording tracks 28a–28d of the recording track set 28. In other words, time lags are established between the peaks of the recording tracks 28a–28d. This difference of the phase can be utilized to discriminate the recording tracks 28a–28d in the recording track set 28. When four of the recording tracks 28a–28d are included in the recording track set 28, for example, the half of pi ($\pi/2$) is set for the difference of the phase between the adjacent recording tracks 28a–28d.

Figure 4:
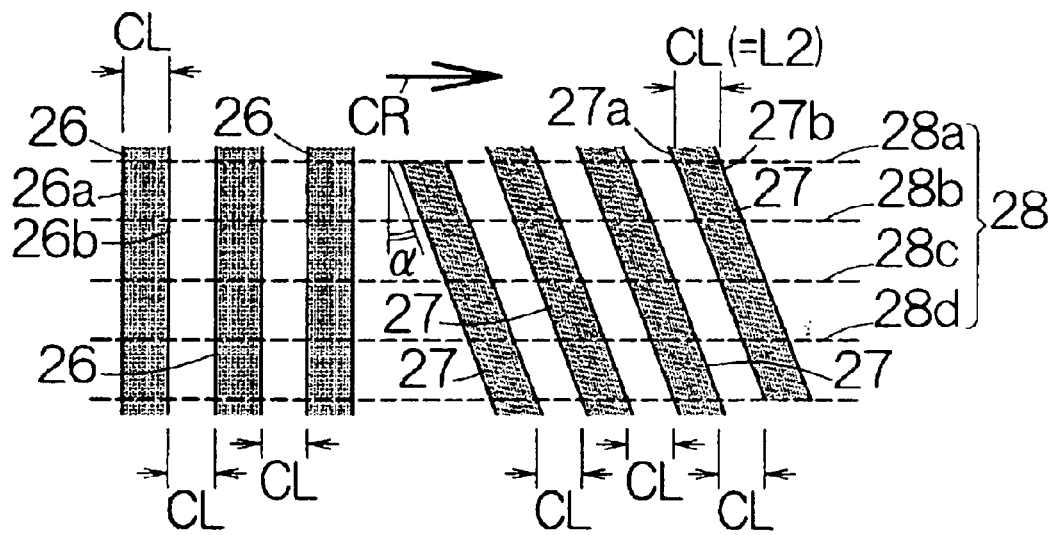
FIG. 4 is a schematic view illustrating a servo track established on the magnetic recording disk at an outer radial position.

As shown in FIGS. 3 and 4, the magnitude of the constant space CL depends upon the position of the servo pattern 25 in the radial direction of the magnetic recording disk 13. Specifically, the constant space CL is set proportional to the distance r from the center of the magnetic recording disk 13 within the reference and phase magnetized stripes 26, 27. Accordingly, a relatively smaller constant value L1 is set for the constant space CL at the inner side of the magnetic recording disk 13. On the other hand, a relatively larger constant value L2 is set for the constant space CL at the outer side of the magnetic recording disk 13. The inclination angle α defined between the phase magnetized stripes 27 and the radius of the magnetic recording disk 13 increases at a position closer to the outer periphery of the magnetic recording disk 13. The constant spaces CL as described above serve to ensure equal intervals of the peaks in a signal reproduced at the read element passing the reference magnetized stripes 26 as well as the phase magnetized stripes 27 irrespective of the radial position of the magnetic recording disk 13.

Now, assume that a pulse signal is to be generated based on the servo pattern 25 during the rotation of the magnetic recording disk 13. First of all, the read/write electromagnetic transducer is positioned over the recording track set 28. The read/write electromagnetic transducer is then positioned above one of the recording tracks 28a–28d within the recording track set 28. A pulse signal is first generated based on the reference magnetized stripes 26. A pulse signal is then generated based on the phase magnetized stripes 27. The interval is determined between the pulse signals. As shown in FIGS. 3 and 4, when the innermost recording track 28a is to be selected within the recording track set 28, the maximum and minimum peaks should alternately appear at equal intervals of $2\pi$ all over the reference and phase magnetized stripes 26, 27. The positioning of the read/write electromagnetic transducer is completed when a signal reproduced at the read element has started to follow the change of this type. When the second recording track 28b outside the innermost recording track 28a is to be selected, the interval of $2\pi$ and $\pi/2$ in total is to be established between the reference magnetized stripes 26 and the phase magnetized stripes 27. The positioning of the read/write electromagnetic transducer is completed when a signal reproduced at the read element has started to follow the change of this type. Likewise, when the third recording track 28c outside the second recording track 28b is to be selected, the interval of $3\pi$ is to be established between the reference magnetized stripes 26 and the phase magnetized stripes 27. When the outermost recording track 28d is to be selected, the interval of $3\pi$ and $\pi/2$ in total is to be established between the reference magnetized stripes 26 and the phase magnetized stripes 27.

Figure 5:
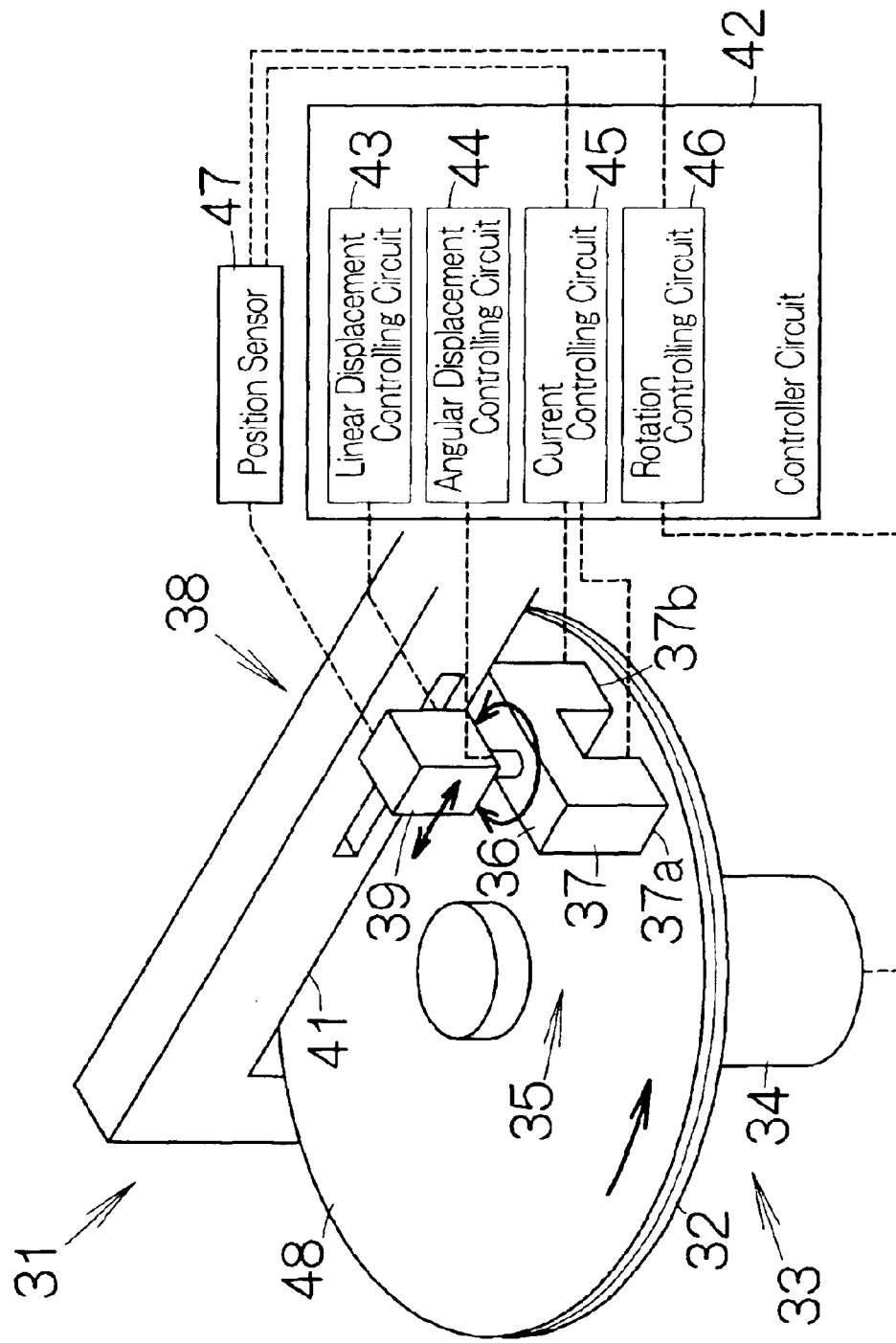
FIG. 5 is a perspective view schematically illustrating the structure of a magnetic transfer apparatus according to a first embodiment of the present invention.

FIG. 5 schematically illustrates a magnetic transfer apparatus 31 utilized to establish the servo pattern 25. The magnetic transfer apparatus 31 of a first embodiment includes a support mechanism 33 designed to support a magnetic disk 32. The support mechanism 33 allows the magnetic disk 32 to be received on a driving shaft 34 extending in the vertical direction, for example. The driving shaft 34 serves to drive the magnetic disk 32 for rotation within a predetermined horizontal plane.

A magnetizing mechanism 35 is associated with the support mechanism 33. The magnetizing mechanism 35 includes an electromagnet 36 designed to generate a magnetic field in response to supply of an electric current. The electromagnet 36 may include a magnetic core 37 and a coil, not shown, wound around the magnetic core 37, as conventionally known. When the magnetic disk 32 is mounted on the driving shaft 34, the electromagnet 36 opposes the opposite ends or magnetic poles 37a, 37b to the surface of the magnetic disk 32. Magnetic flux exchanged between the magnetic poles 37a, 37b forms a magnetic field.

A displacement mechanism 38 is coupled to the electromagnet 36. The displacement mechanism 38 includes a support member 39 and a guide rail 41, for example. The support member 39 is designed to hold the electromagnet 36 for relative rotation around a vertical rotational axis. The guide rail 41 is designed to guide a horizontal movement of the support member 39. The support member 39 may contain an electric motor as well as gears to drive the electromagnet 36 for rotation. When the magnetic disk 32 is mounted on the driving shaft 34, the electromagnet 36 is allowed to change its attitude around the rotational axis perpendicular to the surface of the magnetic disk 32.

A driving mechanism may be employed to drive the support member 39. The driving mechanism may include a rack and a pinion, for example. An electric motor is coupled to the pinion. The angular amount of rotation of the electric motor determines the amount of movement of the support member 39. When the support member 39 moves along the guide rail 41, the electromagnet 36 is allowed to move in a horizontal direction along a straight line passing through the central axis of the driving shaft 34. When the magnetic disk 32 is mounted on the driving shaft 34, the displacement mechanism 38 induces the horizontal movement of the electromagnet 36 along the radius of the magnetic disk 32.

A controller circuit 42 is connected to the magnetizing mechanism 35. The controller circuit 42 contains a linear displacement controlling circuit 43 as well as an angular displacement controlling circuit 44. The linear displacement controlling circuit 43 is designed to control the linear movement of the support member 39 along the guide rail 41. The linear displacement controlling circuit 43 maybe constructed to supply the electric motor in the displacement mechanism 38 with a predetermined electric signal. The angular displacement controlling circuit 44 is designed to control the attitude of the electromagnet 36 around the vertical rotational axis relative to the support member 39. The angular displacement controlling circuit 44 may be constructed to supply the electric motor within the support member 39 with a predetermined electric signal. The displacement controlling circuits 43, 44 operate in accordance with a predetermined processing program in controlling the movement of the support member 39 and the attitude of the electromagnet 36.

The controller circuit 42 further contains a current controlling circuit 45 and a rotation controlling circuit 46. The current controlling circuit 45 is designed to control the magnitude and direction of the electric current supplied to the electromagnet 36. The rotation controlling circuit 46 is designed to control the rotational speed of the magnetic disk 32, namely of the driving shaft 34. The rotation controlling circuit 46 may be constructed to supply a predetermined electric signal to a spindle motor, not shown, connected to the driving shaft 34. The controlling circuits 45, 46 operate in accordance with a predetermined processing program in controlling the magnitude and direction of the electric current and the rotational speed of the driving shaft 34.

A position sensor 47 is associated with the electromagnet 36. The position sensor 47 is designed to detect the position of the electromagnet 36 along the guide rail 41. Specifically, when the magnetic disk 32 is mounted on the driving shaft 34, the output of the position sensor 47 can be utilized to determine the position of the electromagnet 36 in the radial direction of the magnetic disk 32. The position sensor 47 outputs a detection signal specifying the radial position of the electromagnet 36. The detection signal is supplied to the current controlling circuit 45 as well as the rotation controlling circuit 46. Here, the position sensor 47 may detect the position of the electromagnet 36 based on the electromagnet 36 itself. Alternatively, the position sensor 47 may detect the position of the electromagnet 36 based on the action of the displacement mechanism 38. Otherwise, any means may be employed to detect the position of the electromagnet 36.

Figure 6:
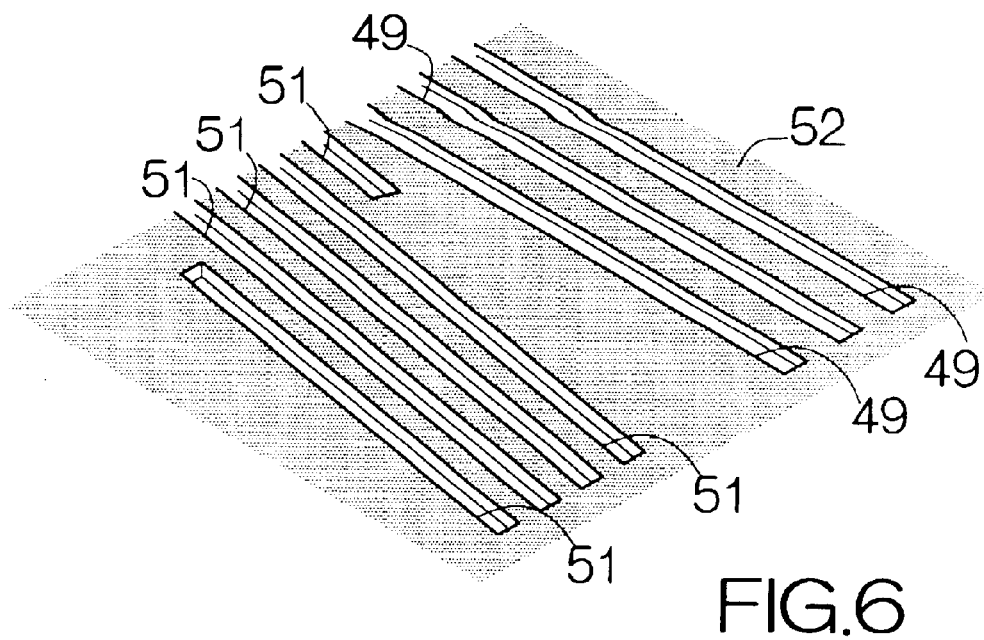
FIG. 6 is an enlarged partial perspective view schematically illustrating the structure of a master magnetic body or master disk.

A master magnetic body or master disk 48 is incorporated within the magnetizing mechanism 35. The master disk 48 is superposed on the surface of the magnetic disk 32 mounted on the driving shaft 34. As shown in FIG. 6, first depressions or grooves 49 and second depressions or grooves 51 are defined within the surface of the master disk 48. The first grooves 49 reflect the shape of the reference magnetized stripes 26, while the second grooves 51 reflect the shape of the phase magnetized stripes 27. When the master disk 48 is overlaid on the surface of the magnetic disk 32, the master disk 48 allows a contact surface 52 around the first and second grooves 49, 51 to uniformly contact the magnetic disk 32. Since the shapes of the first and second grooves 49, 51 correspond to the shapes of the reference and phase magnetized stripes 26, 27, the first and second grooves 49, 51 have an increased width in the circumferential direction of the magnetic disk 32 at a position closer to the outer periphery of the magnetic disk 32. In addition, the second grooves 51 are defined to have an inclination corresponding to that of the phase magnetized stripes 27. Accordingly, the inclination angle α between the first and second grooves 49, 51 likewise gets increased at a position closer to the outer periphery of the magnetic disk 32.

Now, assume that the servo pattern 25 is to be established on the magnetic disk 32. The magnetic disk 32 is first mounted on the driving shaft 34 of the support mechanism 33. No magnetization is established on the surface of the magnetic disk 32. The displacement mechanism 38 operates to bring the electromagnet 36 to the innermost position of the magnetic disk 32, for example. A specific instruction signal maybe supplied to the displacement mechanism 38 from the linear displacement controlling circuit 43.

The driving shaft 34 then starts rotating in response to a specific instruction signal from the rotation controlling circuit 46. The magnetic disk 32 thus rotates. The rotational speed of the magnetic disk 32 may be set at 60 rpm, for example. The current controlling circuit 45 thereafter starts supplying an electric current to the electromagnet 36.

Figure 7:
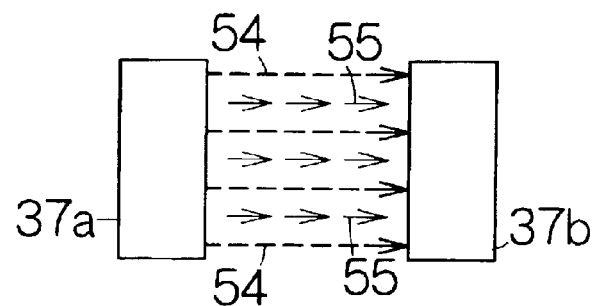
FIG. 7 is a schematic view illustrating the magnetization first established on the magnetic disk.

When the electric current is supplied to the electromagnet 36, a magnetic flux 54 is exchanged between the magnetic poles 37a, 37b in the circumferential direction of the magnetic disk 32, as shown in FIG. 7. The magnetic flux 54 serves to establish magnetization 55 on the magnetic disk 32 in the direction opposite to the aforementioned predetermined direction. The support mechanism 38 forces the electromagnet 36 to move toward the outer periphery of the magnetic disk 32 in the radial direction of the magnetic disk 32 during the rotation of the magnetic disk 32. The magnetization 55 is thus uniformly established in this manner all over the surface of the magnetic disk 32.

In this case, the rotational speed of the driving shaft 34 may be decreased as the electromagnet 36 approaches the outer periphery of the magnetic disk 32. The position sensor 47 detects the radial position of the electromagnet 36. The rotation controlling circuit 46 controls the rotational speed of the driving shaft 34 based on the detection signal from the position sensor 47. The rotation controlling circuit 46 serves to maintain a constant relative speed between the electromagnet 36 and the surface of the rotating magnetic disk 32. If the relative speed is maintained constant between the electromagnet 36 and the magnetic disk 32 all over the radial positions of the magnetic disk 32, the magnetic disk 32 is allowed to receive the magnetic flux 54 of the electromagnet 36 with a constant offset of the magnetic field irrespective of the position of the electromagnet 36 in the radial direction of the magnetic disk 32. The magnetization 55 is thus uniformly established all over the surface of the magnetic disk 32. If the relative speed varies between the electromagnet 36 and the magnetic disk 32, the offset of the magnetic field is expected to establish the magnetization of different intensities over the surface of the magnetic disk 32.

The master disk 48 is thereafter overlaid on the surface of the magnetic disk 32. The displacement mechanism 38 operates to bring back the electromagnet 36 to the innermost position of the magnetic disk 32. The driving shaft 34 then starts rotating. The magnetic disk 32 thus rotates. The rotational speed of the magnetic disk 32 may be set at 60 rpm in the same manner.

Figure 8:
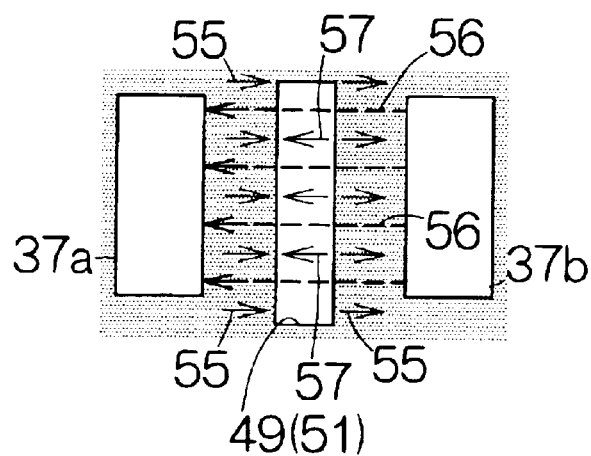
FIG. 8 is a schematic view illustrating the magnetization established within a depression of the master disk.

The electromagnet 36 is allowed to receive the electric current in the reverse direction this time. A magnetic flux 56 is exchanged between the magnetic poles 37a, 37b in the circumferential direction of the magnetic disk 32, as shown in FIG. 8. The direction of the magnetic flux 56 is inverted from the magnetic flux 54. The magnetic flux 56 serves to establish a magnetic field within the grooves 49, 51 on the master disk 48. The magnetic field within the grooves 49, 51 serves to establish magnetization 57 on the surface of the magnetic disk 32. The magnetization 57 is thus overwritten on the magnetic disk 32 in the aforementioned predetermined direction along the circumferential direction of the magnetic disk 32. On the other hand, the master disk 48 is forced to completely contact the magnetic disk 32 around the grooves 49, 51. This contact of the master disk 48 serves to avoid generation of a magnetic field around the grooves 49, 51. Establishment of the magnetization 57 is thus avoided around the grooves 49, 51. The aforementioned magnetization 55 is maintained around the grooves 49, 51.

The electromagnet 36 moves in the radial direction of the magnetic disk 32. The position sensor 47 detects the radial position of the electromagnet 36. The current controlling circuit 45 adjusts the magnitude of the electric current based on the detection signal from the position sensor 47. This adjustment serves to establish a magnetic field of a constant intensity within the grooves 49, 51 irrespective of the position of the electromagnet 36 in the radial direction of the magnetic disk 32.

Figure 9:
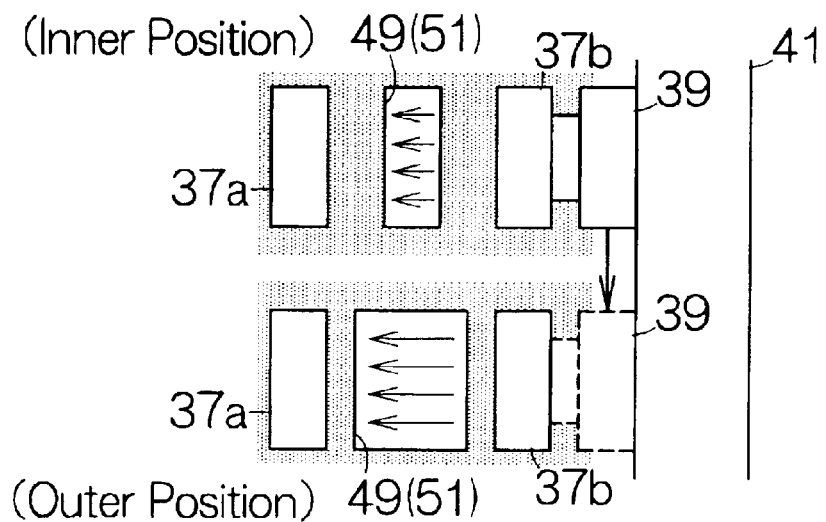
FIG. 9 is a schematic view illustrating a magnetic field established within grooves at inner and outer positions of the magnetic disk.

As described above, the grooves 49, 51 are defined to reflect the shapes of the reference and phase magnetized stripes 26, 27. As shown in FIG. 9, the grooves 49, 51 are defined to have a larger width in the circumferential direction at a position closer to the outer periphery of the magnetic disk 32. The increase in the width leads to an increased space between the opposed surfaces within the grooves 49, 51. Specifically, a write gap defined in the master disk 48 is increased at a position closer to the outer periphery of the magnetic disk 32. The simple increase in the write gap induces a decrease in the intensity of the generated magnetic field. If the electric current supplied to the electromagnet 36 is increased in response to the increase in the write gap, the intensity of the magnetic field can be maintained constant within the grooves 49, 51 at any radial position of the magnetic disk 32. The magnetization 57 of the constant intensity can be established for the reference and phase magnetized stripes 26, 27 all over the surface of the magnetic disk 32. The current level or value of the electric current for the electromagnet 36 may be set based on an actual measurement or a theoretical calculation. The intensity of the magnetic field within the grooves 49, 51 may also be determined based on an actual measurement or a theoretical calculation.

Figure 10:
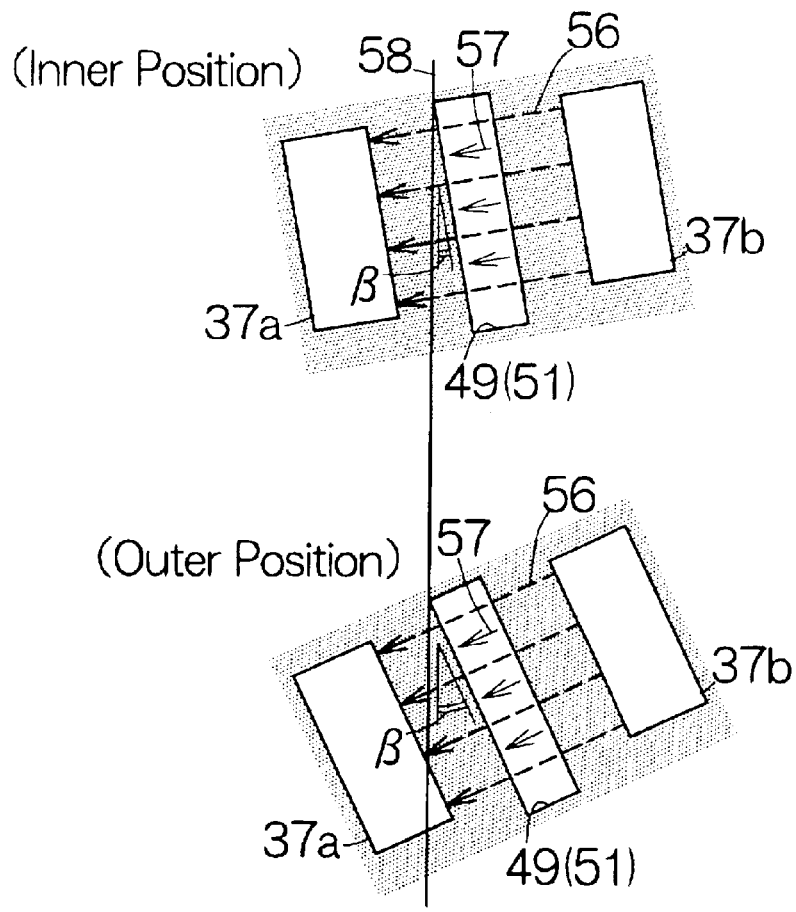
FIG. 10 is a schematic view illustrating a magnetic field generated between magnetic poles when the inclination angle varies between the radius of the magnetic disk and the grooves.

The angular displacement controlling circuit 44 may adjust the attitude of the electromagnet 36 around the rotational axis based on the detection signal from the position sensor 47. This adjustment contributes to a fine adjustment of the intensity of the magnetic field within the grooves 49, 51. As described above, the grooves 49, 51 are defined to reflect the shapes of the reference and phase magnetized stripes 26, 27. The first grooves 49 corresponding to the reference magnetized stripes 26 are designed to change the inclination angle defined between the grooves 49 and the radius of the magnetic disk 32. In addition, the second grooves 51 corresponding to the phase magnetized stripes 27 are also designed to increase the inclination angle α, defined between the second grooves 51 and the first grooves 49 corresponding to the reference magnetized stripes 26, at a location closer to the outer periphery of the magnetic disk 32. As shown in FIG. 10, if the attitude of the electromagnet 36 follows the inclination angle β between the grooves 49, 51 and the radius 58 of the magnetic disk 32, the magnetic flux 56 is allowed to cross the grooves 49, 51 by the minimum length. The magnetic field of the maximum intensity is thus reliably formed within the grooves 49, 51. Here, the attitude of the electromagnet 36 is first controlled based on the inclination angle β of the reference magnetized stripes 26 during the movement of the electromagnet 36 from the innermost position to the outermost position. The attitude of the electromagnet 36 is thereafter controlled based on the inclination angle β of the phase magnetized stripes 27 during the subsequent movement of the electromagnet 36 from the inner most position to the outermost position.

Moreover, the rotational speed of the driving shaft 34 may be decreased as the electromagnet 36 approaches the outer periphery of the magnetic disk 32. The position sensor 47 detects the radial position of the electromagnet 36. The rotation controlling circuit 46 controls the rotational speed of the driving shaft 34 based on the detection signal from the position sensor 47. The rotation controlling circuit 46 serves to maintain a constant relative speed between the electromagnet 36 and the surface of the rotating magnetic disk 32. If the relative speed is maintained constant between the electromagnet 36 and the magnetic disk 32 all over the radial positions of the magnetic disk 32, the magnetic disk 32 is allowed to receive the magnetic flux 56 of the electromagnet 36 with a constant offset of the magnetic field irrespective of the position of the electromagnet 36 in the radial direction of the magnetic disk 32.

As described above, the magnetic transfer apparatus 31 realizes a reliable establishment of the magnetization 57 having a constant intensity at the reference and phase magnetized stripes 26, 27 over the surface of the magnetic disk 32. The magnetic transfer apparatus 31 alone serves to establish the servo pattern 25 of a clear magnetization on the magnetic disk 32. Magnetization needs not be over written on the magnetic disk 32 with a read/write electromagnetic transducer incorporated within the resulting HDD 11. Establishment of the servo pattern 25 can be facilitated and realized in a shorter period.

Figure 11:
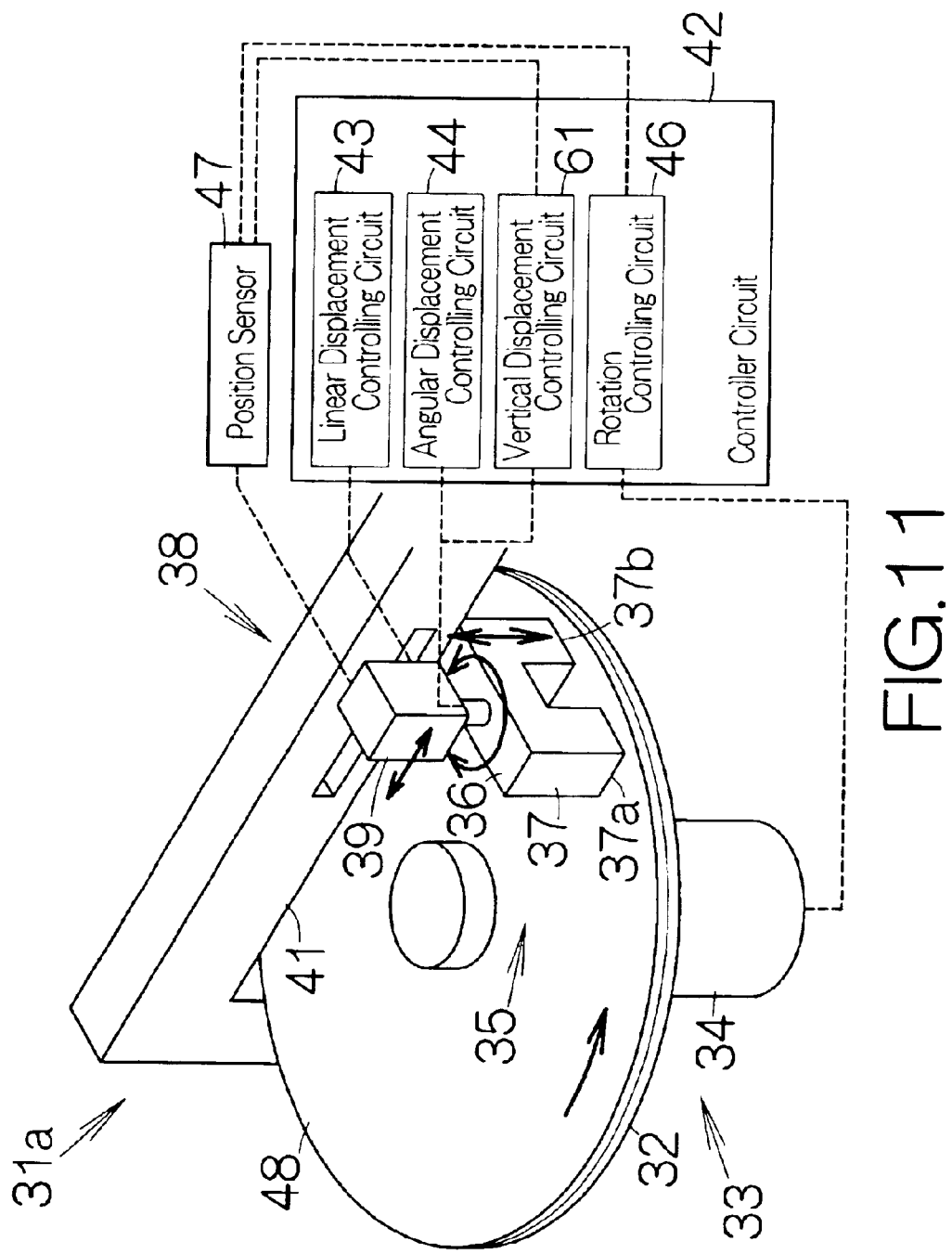
FIG. 11 is a perspective view schematically illustrating the structure of a magnetic transfer apparatus according to a second embodiment of the present invention.

FIG. 11 schematically illustrates a magnetic transfer apparatus 31a according to a second embodiment of the present invention. The displacement mechanism 38 is designed to move the electromagnet 36 in the vertical direction in this second embodiment. The support member 39 may contain a rack, a pinion and an electric motor for realizing the vertical movement of the electromagnet 36, for example. When the magnetic disk 32 is mounted on the driving shaft 34 in the magnetic transfer apparatus 31a, the electromagnet 36 is allowed to displace in the vertical direction perpendicular to the surface of the magnetic disk 32. In this case, a vertical displacement controlling circuit 61 is incorporated within the controller circuit 42 for controlling the vertical movement of the electromagnet 36. The vertical displacement controlling circuit 61 operates in accordance with a predetermined processing program in controlling the vertical movement of the electromagnet 36. The position sensor 47 supplies the vertical displacement controlling circuit 61 with the detection signal. Like reference numerals are attached to structures or components equivalent to those of the aforementioned first embodiment.

The magnetic field within the grooves 49, 51 can be adjusted based on the distance between the electromagnet 36 and the master disk 48 in the magnetic transfer apparatus 31a of the second embodiment. Specifically, the intensity of the magnetic field within the grooves 49, 51 gets decreased as the electromagnet 36 gets distanced from the master disk 48 in the vertical direction. Accordingly, the electromagnet 36 may be allowed to approach the master disk 48 at a position closer to the outer periphery of the magnetic disk 32. Here, the electromagnet 36 may receive the electric current of the constant magnitude during the radial movement. A permanent magnet may be utilized in place of the electromagnet 36 in the magnetizing mechanism 35. Such a permanent magnet usually generates a magnetic field based on an inherent magnetic property.

Figure 12:
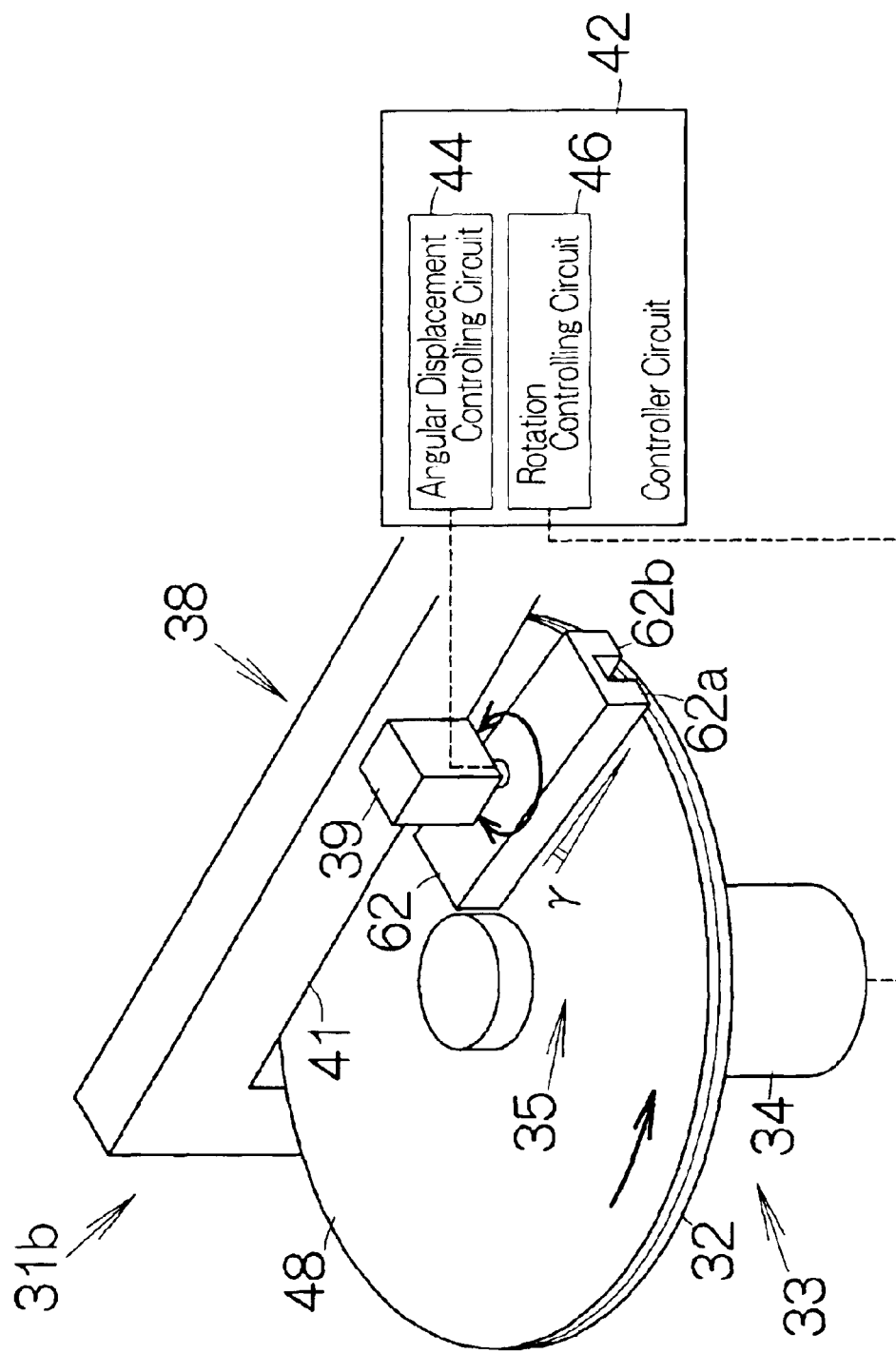
FIG. 12 is a perspective view schematically illustrating the structure of a magnetic transfer apparatus according to a third embodiment of the present invention.

FIG. 12 schematically illustrates a magnetic transfer apparatus 31b according to a third embodiment of the present invention. An elongated electromagnet 62 is incorporated within the magnetizing mechanism 35 in this third embodiment. The elongated electromagnet 62 extends from the center of the magnetic disk 32 to the outer periphery of the magnetic disk 32. The electromagnet 62 includes a pair of magnetic poles 62a, 62b opposed to the master disk 48. The distance between the electromagnet 62 and the magnetic disk 32 varies at positions in the radial direction of the magnetic disk 32. The magnetic poles 62a, 62b of the electromagnet 62 are allowed to get closer to the master disk 48 at a position closer to the outer periphery of the magnetic disk 32. The intensity of the magnetic field within the grooves 49, 51 gets increased at a position closer to the outer periphery of the magnetic disk 32. The electromagnet 62 may receive the electric current of the constant magnitude. It is not necessary to move the support member 39 along the guide rail 41 in the horizontal direction in the magnetic transfer apparatus 31b of this type. It is not necessary to detect the position of the electromagnet 62 in the radial direction of the magnetic disk 32 with the position sensor 47. The structure of the magnetic transfer apparatus 31b can be facilitated. A permanent magnet may be utilized in place of the electromagnet 62 in the magnetizing mechanism 35 of this type. Such a permanent magnet usually generates a magnetic field based on an inherent magnetic property. The magnetic poles 62a, 62b of the electromagnet 62 may include a flat surface or curved surface opposed to the master disk 48. The curved surface may be designed based on the distance or space required between the master disk 48 and the magnetic poles 62a, 62b at all the radial positions. In any event, a constant space or distance may be set between the magnetic poles 62a, 62b along the radial direction of the magnetic disk 32. Like reference numerals are attached to structures or components equivalent to those of the aforementioned first and second embodiments.

Figure 13:
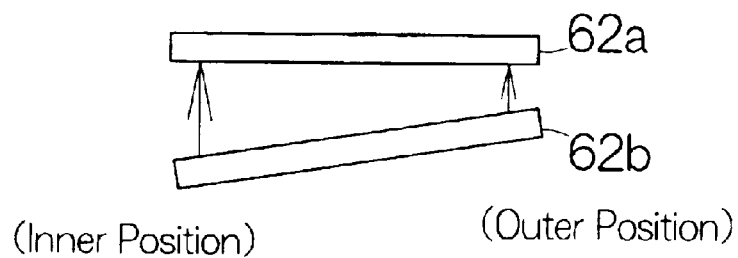
FIG. 13 is an enlarged plan view schematically illustrating an electromagnet according to a modified example.

As shown in FIG. 13, the space between the magnetic poles 62a, 62b may vary in the magnetic transfer apparatus 31b at a position closer to the outer periphery of the magnetic disk 32, for example. This enables a horizontal attitude of the electromagnet 62 in parallel with the surface of the master disk 48. The structure of the magnetic transfer apparatus 31b can further be facilitated.

Figure 14:
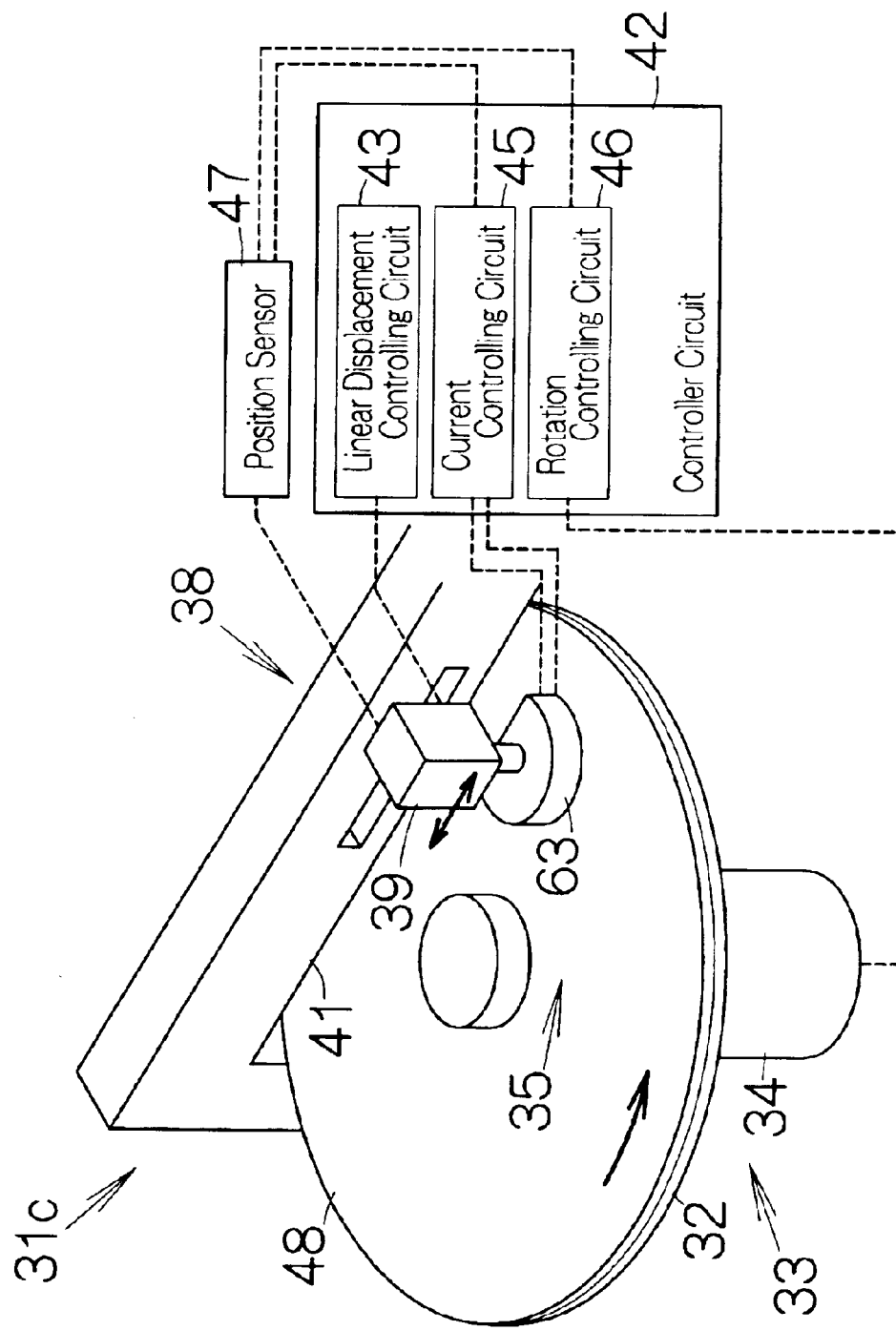
FIG. 14 is a perspective view schematically illustrating the structure of a magnetic transfer apparatus according to a fourth embodiment of the present invention.

FIG. 14 schematically illustrates a magnetic transfer apparatus 31c according to a fourth embodiment of the present invention. An electromagnet 63 is supported on the support member 39 moveable along the guide rail 41 in the same manner as described above in the first and second embodiments. The electromagnet 63 is stationary to the support member 39 around the aforementioned vertical rotational axis. Like reference numerals are attached to structures or components equivalent to those of the aforementioned first and second embodiments.

Figure 15:
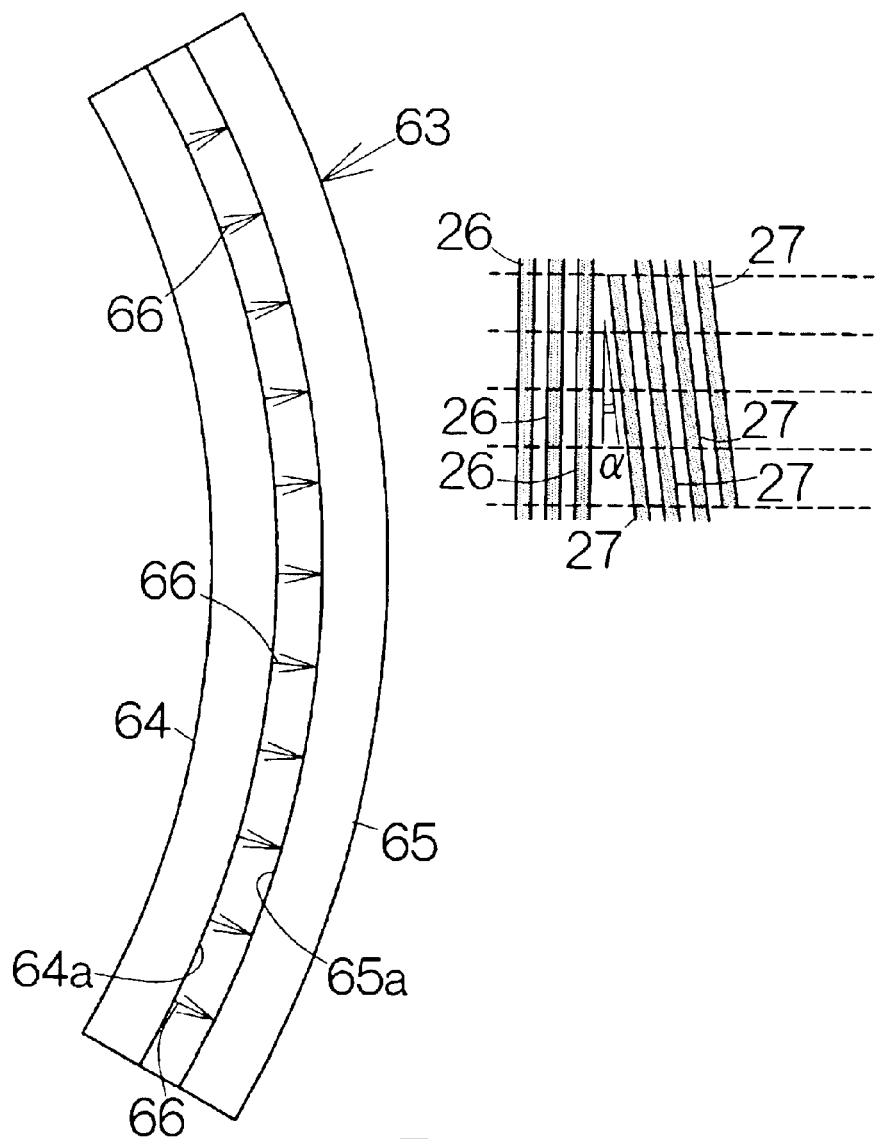
FIG. 15 is a schematic view illustrating the structure of magnetic poles.

As shown in FIG. 15, the electromagnet 63 includes first and second magnetic poles 64, 65 extending in parallel with each other in the radial direction of the magnetic disk 32. A curved surface 64a of a predetermined curvature is defined on the first magnetic pole 64. Likewise, a curved surface 65a of a predetermined curvature is defined on the second magnetic pole 65. The curved surface 64a is equally distanced from the curved surface 65a over the entire length. A magnetic flux 66 is exchanged between the first and second magnetic poles 64, 65 in many directions within a plane including the surface of the magnetic disk 32. The electromagnet 63 enables generation of the magnetic flux along straight lines penetrating through the center of the curvature. Even when the inclination angle β varies between the grooves 49, 51 and the radius of the magnetic disk 32 in the aforementioned manner, the magnetic flux 66 is allowed to cross the grooves 49, 51 by the minimum length without a change in the attitude of the electromagnet 63. Moreover, once the electromagnet 63 moves in the radial direction of the magnetic disk 32, the magnetization of a sufficient intensity can be established in the reference and phase magnetized stripes 26, 27 irrespective of the inclination angle β of the grooves 49, 51. A permanent magnet may be utilized in place of the electromagnet 63 in the magnetizing mechanism 35 of this type. Such a permanent magnet usually generates a magnetic field based on an inherent magnetic property.

What is claimed is:

1. A magnetic transfer apparatus comprising:
   a support mechanism designed to support a magnetic disk;
   a master magnetic body contacting against the magnetic disk a contact surface bordered along a contour of a servo pattern, said master magnetic body defining in the contact surface a depression corresponding to a shape of the servo pattern, a circumferential extent of the depression being set larger at an outer position of the magnetic disk than an inner position of the magnetic disk; and
   a magnet designed to face the master magnetic body, said magnet applying a magnetic field to the master magnetic body so as to form a magnetic field for writing within the depression, an intensity of the magnetic field within the depression being variable in response to a change of position in a radial direction of the magnetic disk.

2. The magnetic transfer apparatus according to claim 1, further comprising:
   a position sensor related to the magnet so as to detect a position of the magnet in the radial direction of the magnetic disk,
   wherein the intensity of the magnetic field within the depression is set based on the position detected by the position sensor.

3. The magnetic transfer apparatus according to claim 2, further comprising a magnetic intensity adjusting mechanism related to the magnet, said magnetic intensity adjusting mechanism designed to drive the magnet for rotation around a rotation axis intersecting a surface of the magnetic disk in accordance with the position of the magnet.

4. The magnetic transfer apparatus according to claim 3, wherein said support mechanism comprises:
   a driving shaft receiving the magnetic disk; and
   a controlling mechanism related to the driving shaft, said controlling mechanism designed to change a rotation speed of the driving shaft in accordance with the position of the magnet.

5. The magnetic transfer apparatus according to claim 1, wherein
   the magnet is an electromagnet designed to generate the magnetic field for writing within the depression in response to supply of electric power, the magnetic transfer apparatus further comprising a magnetic intensity adjusting mechanism related to the electromagnet, said magnetic intensity adjusting mechanism designed to change a magnitude of the electric power in accordance with a displacement of the electromagnet in the radial direction of the magnetic disk.

6. The magnetic transfer apparatus according to claim 5, wherein said magnetic intensity adjusting mechanism is designed to drive the electromagnet for rotation around a rotation axis intersecting a surface of the magnetic disk in accordance with the displacement of the electromagnet.

7. The magnetic transfer apparatus according to claim 6, wherein said support mechanism comprises:
   a driving shaft receiving the magnetic disk; and
   a controlling mechanism related to the driving shaft, said controlling mechanism designed to change a rotation speed of the driving shaft in accordance with the displacement of the electromagnet.

8. The magnetic transfer apparatus according to claim 1, further comprising
   a magnetic intensity adjusting mechanism related to the magnet, said magnetic intensity adjusting mechanism designed to drive the magnet for rotation around a rotation axis intersecting a surface of the magnetic disk in accordance with the displacement of the magnet in the radial direction.

9. The magnetic transfer apparatus according to claim 8, wherein said support mechanism comprises:
   a driving shaft receiving the magnetic disk; and
   a controlling mechanism related to the driving shaft, said controlling mechanism designed to change a rotation speed of the driving shaft in accordance with the displacement of the magnet in the radial direction.

10. The magnetic transfer apparatus according to claim 1, wherein
    the magnet includes a pair of magnetic poles spaced from the master magnetic body at variable distances in accordance with positions in the radial direction of the magnetic disk.

11. The magnetic transfer apparatus according to claim 10, further comprising a magnetic intensity adjusting mechanism designed to drive the magnetic poles for rotation around a rotation axis intersecting a surface of the magnetic disk.

12. The magnetic transfer apparatus according to claim 11, wherein said support mechanism comprises:
    a driving shaft receiving the magnetic disk; and
    a controlling mechanism related to the driving shaft, said controlling mechanism designed to change a rotation speed of the driving shaft in accordance with an angle of the rotation of the magnetic poles.

13. The magnetic transfer apparatus according to claim 1, wherein
    the magnet includes a pair of magnetic poles spaced from each other at variable distances in accordance with positions in the radial direction of the magnetic disk.

14. The magnetic transfer apparatus according to claim 13, further comprising a magnetic intensity adjusting mechanism designed to drive the magnetic poles for rotation around a rotation axis intersecting a surface of the magnetic disk.

15. The magnetic transfer apparatus according to claim 14, wherein said support mechanism comprises:
    a driving shaft receiving the magnetic disk; and
    a controlling mechanism related to the driving shaft, said controlling mechanism designed to change a rotation speed of the driving shaft in accordance with an angle of the rotation of the magnetic poles.

16. The magnetic transfer apparatus according to claim 13, wherein a distance between the magnetic poles is set larger at a position closer to the inner position than a position closer to the outer position.

17. The magnetic transfer apparatus according to claim 1, wherein
    the magnet includes a pair of magnetic poles designed to generate a flow of magnetic flux in at least first and second directions within a plane including a surface of the magnetic disk.

18. The magnetic transfer apparatus according to claim 17, wherein a curved surface is defined on at least one of the magnetic poles, the curved surface being opposed to other of the magnetic poles.

19. The magnetic transfer apparatus according to claim 18, wherein said support mechanism comprises:
    a driving shaft receiving the magnetic disk; and
    a controlling mechanism related to the driving shaft, said controlling mechanism designed to change a rotation speed of the driving shaft in accordance with a displacement of the magnetic poles in the radial direction of the magnetic disk.

20. The magnetic transfer apparatus according to claim 17, wherein the magnetic poles extend in parallel with each other, each of the magnetic poles defining a curved surface opposed to other of the magnetic poles.

21. A magnetic transfer apparatus comprising:
    a support mechanism designed to support a magnetic disk;
    a master magnetic body contacting against the magnetic disk a contact surface bordered along a contour of a servo pattern, said master magnetic body defining in the contact surface a depression corresponding to a shape of the servo pattern, a circumferential extent of the depression being set larger at an outer position of the magnetic disk than an inner position of the magnetic disk;
    a magnet designed to face the master magnetic body, said magnet applying a magnetic field to the master magnetic body so as to form a magnetic field for writing within the depression; and
    a magnetic intensity adjusting mechanism related to the magnet, said magnetic intensity adjusting mechanism designed to generate a displacement of the magnet in a vertical direction perpendicular to a surface of the magnetic disk in response to a displacement of the magnet in the radial direction of the magnetic disk.

22. The magnetic transfer apparatus according to claim 21, wherein said magnetic intensity adjusting mechanism is designed to drive the magnet for rotation around a rotation axis intersecting a surface of the magnetic disk in accordance with the displacement of the magnet in the radial direction.

23. The magnetic transfer apparatus according to claim 22, wherein said support mechanism comprises:
    a driving shaft receiving the magnetic disk; and
    a controlling mechanism related to the driving shaft, said controlling mechanism designed to change a rotation speed of the driving shaft in accordance with the displacement of the magnet in the radial direction.

* * * * *